Mar. 20, 1923.
W. HILDEBRAND
BRAKE ACCELERATOR
Filed July 21, 1920
1,449,002
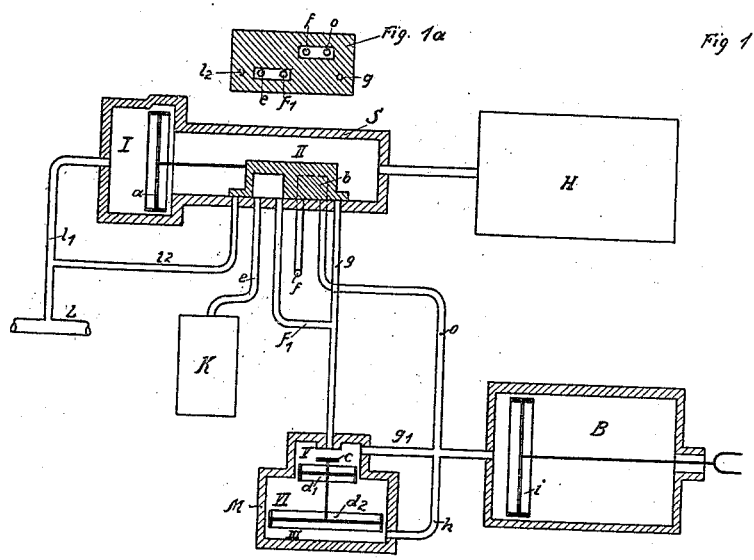
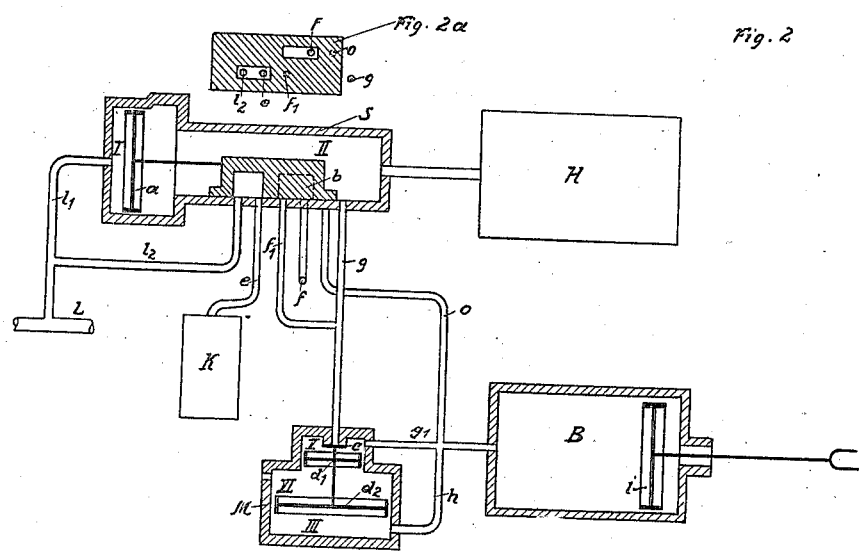
Inventor:
Wilhelm Hildebrand
By Cushman, Bryant & Darby
attys Patented Mar. 20, 1923.

1,449,002

UNITED STATES PATENT OFFICE.

WILHELM HILDEBRAND, OF BERLIN, GERMANY, ASSIGNOR TO KNORR-BREMSE AKTIENGESELLSCHAFT, OF LICHTENBERG, BERLIN, GERMANY.

BRAKE ACCELERATOR.

Application filed July 21, 1920. Serial No. 398,040.

*To all whom it may concern:*

Be it known that I, WILHELM HILDEBRAND, a citizen of the German Republic, residing at Neue Bahnhofstrasse 9–17, Lichtenberg, Berlin, O. 112, Germany, have invented certain new and useful Improvements in Brake Accelerators (for which I have received patents as follows: Germany, No. 301,944, May 4, 1917; Austria, No. 78,468, June 18, 1917; Hungary, No. 74,148, June 18, 1917; Sweden, No. 44,819, June 28, 1917; Switzerland, No. 77,476, June 20, 1917; Italy, No. 251/1615, Oct. 15, 1917; Finland, No. 7,807, June 21, 1919), of which the following is a specification.

This invention relates to brake accelerators for trains in which the emptying of the transfer chamber can only take place by the employment of a valve controlled by the pressure in the brake cylinder when the brake is entirely or almost entirely taken off. Where this valve is interposed in the connection between the train pipe and the transfer chamber, this may under certain circumstances have the disadvantage that the valve is closed too rapidly and the connection interrupted before the equalization is perfect.

According to the present invention the valve is placed on the relief pipe of the chamber, so that the connection between the train pipe and the chamber is not interrupted, and consequently a perfect equalization between the train pipe and the chamber is rendered possible, but the emptying of the chamber can only take place when the brake is taken off. Where triple valves are provided with a minimum pressure valve this arrangement in particular enables the minimum pressure valve to be utilized simultaneously for shutting off the transfer chamber from the outer air. This is effected by connecting the relief pipe of the transfer chamber with the port which leads from the auxiliary air reservoir to the minimum pressure valve when the triple valve is in the "brake on" position, so that the minimum pressure valve conjointly with the triple valve controls the outlet of the transfer chamber, although the inlet of the transfer chamber is solely controlled by the triple valve.

In the drawing is shown a diagrammatic view of the subject matter of the invention.

Figures 1 and 1ª show the brake in the "brake off" position.

Figures 2 and 2ª the brake in the "brake on" position.

The compressed air admitted to the continuous brake pipe L passes therefrom through the branch pipe $l^1$ into the chamber I of the triple valve S, pushing the piston $a$ with the slide valve $b$ into the right hand extreme position, and then passes on through the groove made in the usual way into the chamber II and the auxiliary air reservoir H connected thereto. With the triple valve S is connected the brake cylinder B through the pipe O and also through the pipes $g$ and $g'$; between the latter pipes the minimum pressure valve is interposed, and the pipe $o$ in the position shown in Figure 1 communicates through a recess in the slide valve $b$ with the pipe $f$ which leads to the open air. The chamber K is also connected by a second recess in the slide valve with the pipe $f^1$ and consequently with the pipe $g$, which communicates through the minimum pressure valve and pipe $g^1$ with $o$ and therefore likewise with the outer air. The valve $c$ of the minimum pressure valve M, which controls the communication between the pipes $g$ and $g^1$, is open in this position, namely when the brake is in the "brake off" position, as the chamber III below the differential piston $d^1$, $d^2$ which controls the valve $c$ communicates with the open air through the branch pipe $h$ and the pipe $o$ which serves to take the brake off. In this position of the triple valve the branch pipe $l^2$ is closed by the slide valve. The openings of the different ports in the face of the valve, and also the position of the slide valve relatively to them, can be seen in plan in Figure 1ª.

If now for the purpose of applying the brake, air be allowed to escape from the pipe L the piston $a$ and the slide valve $b$ of the triple valve will move into the position shown in Figures 2 and 2ª. On the one hand this causes the branch pipe $l^2$ leading from the train pipe to be connected through a recess in the slide valve with the transfer chamber K so that the pressure in both chambers is equalized. At the same time the pipe $f$ leading to the outer air is closed and the mouth of the pipe $g$ leading to the brake cylinder exposed, so that the compressed air can pass through the now open minimum pressure valve M into the brake cylinder B. When a slight previously determined initial pressure is attained in the latter, the pressure exerted on the larger face of the differential piston preponderates in the chamber III and closes the valve $c$. The further increase of pressure in the brake cylinder B takes place in the well known way through special recesses and passages in the slide valve and special connections which are not shown. If now compressed air be admitted into the train pipe L for the purpose of partially taking the brake off, the piston $a$ together with the slide valve $b$ moves back into its right hand position, in which the chamber K is connected by the pipe $e$, the recess in the slide valve and the pipe $f^1$ with the pipe $g$. Now as the valve $c$ is still closed by the pressure which exists in the brake cylinder and acts upwardly on the differential piston $d^1$, $d^2$, the pressure in the chamber K is maintained, and it can only escape when the pressure in the brake cylinder has become so low that the pressure in the chamber K on the cross sectional area of the small valve overcomes the pressure in the brake cylinder on the large face of the differential piston $d^1$, $d^2$. At this instant the brake is practically entirely taken off. The compressed air in the chamber K then escapes along with the compressed air in the cylinder B through the pipe $o$, the recess in the slide valve and the pipe $f$ into the open air. If however the brake is not completely released, but the braking effect is weakened by temporary inception of the release position of the triple valve, although the slide $b$ places the chamber K in connection with the pipe $g$, the valve $c$ still prevents emptying of the chamber K because the pressure in the brake cylinder is only reduced to such an extent that the combined pressure from the transfer chamber K and auxiliary reservoir H acting on the valve $c$ are insufficient to overcome the pressure from the brake cylinder acting on the piston $d^2$.

What I claim and desire to secure by Letters Patent of the United States is:—

1. In a brake accelerator, a transfer chamber receiving air from the train pipe when an application of the brakes is initiated, a valve controlled by the pressure in the train pipe and controlling the connection of the said pipe with the said chamber, a relief pipe for the transfer chamber, and a valve controlling said relief pipe.

2. In a brake accelerator for triple valves provided with a minimum pressure valve, a transfer chamber receiving air from the train pipe when an application of the brakes is initiated, a valve controlled by the pressure in the train pipe and controlling the connection of the said pipe with the said chamber, a relief pipe for the transfer chamber, said relief pipe being also controlled by the last named valve and connected to the port which leads from the auxiliary air reservoir to the minimum pressure valve when the triple valve is in the "brake on" position, the minimum pressure valve conjointly controlling the outlet of the transfer chamber.

3. In brake accelerating apparatus for trains of vehicles, a train pipe, a transfer chamber having a relief pipe, air connections between the said train pipe and the said chamber, a brake cylinder and a valve controlled by air pressure in the said cylinder and in turn controlling the said relief pipe.

4. In brake accelerating apparatus for trains of vehicles, a train pipe, a transfer chamber having a relief pipe, air connections between the said train pipe and the said chamber, a brake cylinder, a valve controlled by air pressure in the said cylinder and in turn controlling the said relief pipe, an auxiliary air reservoir and air connections between the said reservoir and the said valve.

5. In brake accelerating apparatus for trains of vehicles, a train pipe, a transfer chamber, an auxiliary air reservoir, a brake cylinder, a triple chambered valve, air connections between the said cylinder and the two outer chambers of the said triple chambered valve, an air chamber having pipes connecting it with all the foregoing parts and with the atmosphere, and a reciprocating recessed slide valve in the said air chamber controlling the openings of all the said connecting pipes, for the purposes specified.

WILHELM HILDEBRAND.